(12) United States Patent
Jo

(10) Patent No.: US 8,131,504 B2
(45) Date of Patent: Mar. 6, 2012

(54) METHOD FOR ACHIEVING ARBITRARY PRECISION

(75) Inventor: Martin Jo, Taipei (TW)

(73) Assignee: Martin Jo, Taipei (TW)

( * ) Notice: Subject to any disclaimer, the term of this patent is extended or adjusted under 35 U.S.C. 154(b) by 1151 days.

(21) Appl. No.: 11/855,228

(22) Filed: Sep. 14, 2007

(65) Prior Publication Data

US 2009/0076775 A1 Mar. 19, 2009

(51) Int. Cl.
*G06F 11/30* (2006.01)

(52) U.S. Cl. .................... 702/182; 712/221; 708/490

(58) Field of Classification Search .............. 702/182; 712/221; 708/490
See application file for complete search history.

(56) References Cited

U.S. PATENT DOCUMENTS 5,619,711 A * 4/1997 Anderson .................. 712/221

OTHER PUBLICATIONS

Kuphaldt (Lessons in Electric Circuits, vol. I-DC, Fifth Edition, last update Oct. 18, 2006).*

* cited by examiner

*Primary Examiner* — Drew A Dunn
*Assistant Examiner* — Hien Vo

(57) ABSTRACT

A system includes a serial connection mode for obtaining a first approximation to a zero error result by means of a negative rough precision for manufacturing a plurality of first semi-finished products, and a measurement apparatus for measuring a precision value of each first semi-finished product, and a Full-9 Principle for sifting the first semi-finished products. A parallel connection mode is used for obtaining a second approximation to the zero error result by means of a positive rough precision by division to manufacture a plurality of second semi-finished products, and the measurement apparatus is used to measure a precision value of each second semi-finished product, and an error sift formula is utilized to sift the second semi-finished products.

10 Claims, 1 Drawing Sheet

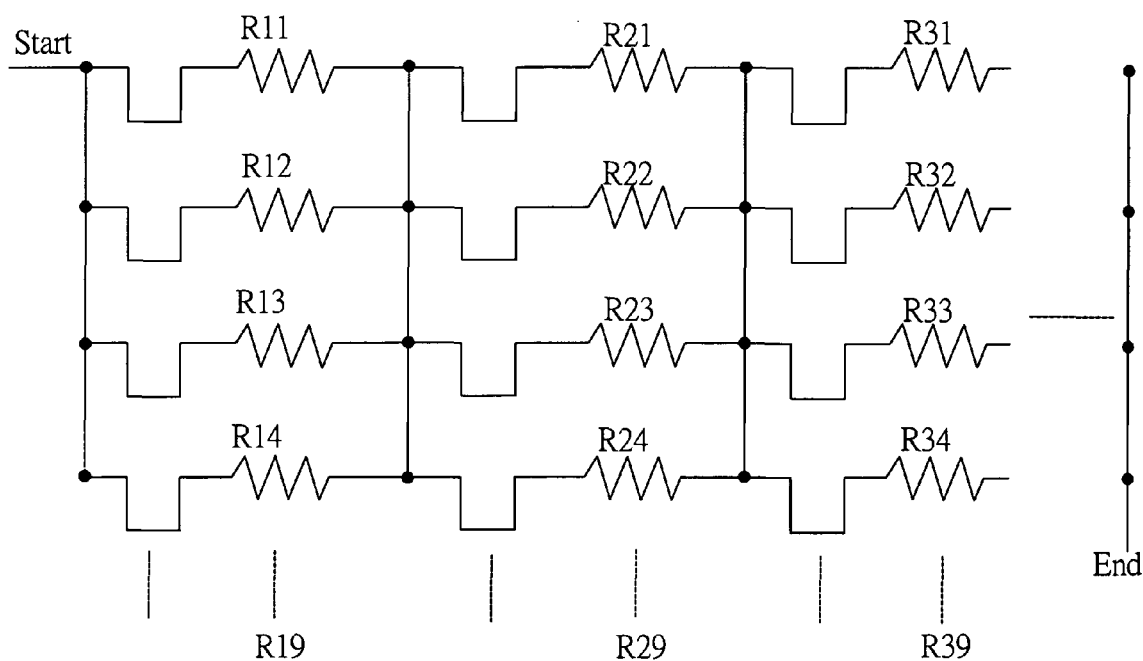

METHOD FOR ACHIEVING ARBITRARY PRECISION

FIELD OF THE INVENTION

The present invention relates a method of increasing precision. More particularly, the present invention relates to a method of converting a low precision into high precision.

BACKGROUND OF THE INVENTION

Currently in order to obtain products of high precision, machines with higher precision are used to produce high-precision manufacture equipments for producing, in which the precision of the finished products completely depend on the precision of the machines themselves; and if the machines can not fulfill this object, the finished products fail naturally. Accordingly, solutions for overcoming this limitation, elevating the precision, and making it easy to manufacture and simple to accomplish have become the important issues.

SUMMARY OF THE INVENTION

The object of the present invention is to provide a method for increasing precision, which is simple and easy. The method may be able to achieve the required precision when in use.

Serial Connection Mode:

According to an aspect of the present invention, the semi-finished product is assumed to have a precision of negative 1%. For example:

99.X is −1% precision of 100
0.099X is −1% precision of 0.1
198.X is −1% precision of 200
594.X is −1% precision of 600

It can be seen that one character of negative 1% is the second digit is always 9, which can be formulated as below:

$$\begin{array}{r} a9bcdef \\ + \ g9hik \\ \hline a99mnop \end{array}$$

in which a9bcdef represents the rough precision of the greater value, g9hik represent the rough precision of the smaller value, and a99mnop represents the value of higher precision for the summation.

Now, the cases for bc+g9 may be observed as below:

$$+ \ gp$$

$$c = 0 \text{ and } \frac{b0 + gp}{99} \qquad \text{Case 1}$$

In order to make b+g=9, so g=9−b;

$$c = 0 \text{ but with a carry-in } 1 \ \frac{b0 + gp}{99} \qquad \text{Case 2}$$

In order to make b+g+1=9, so g=8−b;

$$c = 1 \text{ to } 9. \text{ So } 1 \ \frac{bx + g9}{9x - 1} \qquad \text{Case 3}$$

In order to make b+g+1=9, so g=8−b.

Hence, g can be either 9−b or 8−b, and 8−b takes the possibility of 0.9.

It can be concluded that, independent of the value b, a 9 can be acquired as long as select g=9−b or g=8−b. We can say that after the addition of the original value a9bcdef to g9hik, the value a99mnop can be derived, which is referred by the applicant as "Full-9 Principle".

Thus using this Full-9 Principle, it is possible to derive a combination of a9999 . . . 9, which consists of n 9's, achieving the required precision, and meanwhile such precision is negative; in case a positive precision is needed, then add one 1 to the last 9. As for other precision, a similar value is added to or subtracted from the last 9.

The precision product generated by this Full-9 Principle may be a999999 . . . 9, and if other values should be obtained, then other products can be added. For example, to derive the value 234, it is possible first to generate 199.9, 29.9, 3.9, such that 199.9+29.9+3.9=233.7, or 199.99+29.99+3.99=233.97, completely depending on the precision requited to select each values.

Such a Full-9 Principle may be also used to generate other numbers; in this case, it can be considered as an application of general addition.

To produce the product of negative 1% rough precision, it is certainly inevitable that sometimes it might fall out of such a range. In general, factories will determine this as a bad condition and thus abandon; however, by using the Full-9 Principle, it can be preserved.

For example, 199.9+29.9+3.9=199.9+28.9+4.9=other cases with the same sum. Therefore, as long as the sum remains unchanged, negative 1% rough precision represents merely consistent manufacture quality, facilitates to foresee related ranges, and provides better strategies; meanwhile the deviated or accidental items can be detected by measurement apparatus to know the errors thereof, and got corrected in the next level.

Serial connection multiplication is analogous to addition, Q=Z+W=Z+R*Y, in which make sure the R times, then sift Y to the required precision.

Parallel Connection Mode:

R means idea value.

F means semi-finished value, which must be a positive rough precision, so F>R.

T means additional ideal value.

T1 means rough new value.

R1 mean rough ideal value.

$$R = 1/(1/F + 1/T) \qquad (A)$$

$$= T - K \qquad (A1)$$

in which equation (A) is with a known F, to solve for a value T bigger than F and belong to division. Equation (A1) whereas is with a known T, to solve for a value smaller than T and belong to subtraction, then sifting the value K to the required precision.

$$T = R/(R/N+1) \qquad (B)$$

$$N = F - R \qquad (C)$$

$$R1 = 1/(1/F + 1/T1) \qquad (D)$$

Since T1 is just slightly bigger than R/(R/N+1), R1 is necessarily situated within the positive error, and never in the range of negative error. If T1 is smaller than T, then it will become a negative error, and once it is a negative error, it will never return to positive error, thus, at this moment the serial connection addition can be applied.

M means how many decimal digits behind the decimal dot.
I means number of digits for F−R
G means maximum range for error, 0<G<1.
H means error before correction.
Based the following equation:

$$R(R/N+1)<=T<(G*(10 \text{ of power } I-1)+R)*F/(F-R-G*(10 \text{ of power } I-1)) \quad (E)$$

herein such equation (E) is referred as Error Sifting equation.

T is equal to left hand, more precise; T is equal to right hand, i.e. equal to the maximum of error.

$$\frac{F-R}{10 \text{ of power } I-1} = H \quad (L)$$

For example, F=1234, R=1000, then F−R=234, of 3 digits, thus I=3. Input in the equation L, hence H=2.34.

From H, it can be seen that it is required to correct 2 to zero, and the corrected value needs to be smaller than G.

BRIEF DESCRIPTION OF THE DRAWINGS

FIG. 1 shows a variable resistor using a serial connection mode or a parallel connection mode.

DETAILED DESCRIPTION OF THE EMBODIMENTS

Hereunder the content of the present invent will be further illustrated with embodiments. However, the application of the present technique is not limited to the described embodiments. Other examples to which the present technique can be applied will be also herein incorporated as reference.

Serial Connection Mode:

Take an example of producing resistors of 1,000,000 ohm with precision 0.9999, the last 9 occurs at the hundred-digit position, thus the semi-product needs to be produced from this hundred-digit. For clear illustration, assuming each semi-product had been measured and results thereof have the values enlisted in the Table as below. Certainly each value in the Table may differ from the real manufacture value; however this will not affect the purpose of the present invention.

TABLE

| Initial Value Semi-Product | Semi-Product with Thousand-Digit | Semi-Product with Hundred-Digit |
|---|---|---|
| 994253 | 994 | 99 |
| | 1986 | 198 |
| | 2975 | 298 |
| | 3961 | 397 |
| | 4958 | 495 |
| | 5969 | 596 |
| | 6979 | 696 |
| | 7981 | 798 |
| | 8963 | 893 |
| | 9934 | 998 |

For the initial value 994253, since b=4 and c=2, thus g=8−4=4, and from the Table, the value 4958, and 994253+4958=999211 can be chosen. Now b=2 and c=1, hence g=8−2=6, in the Table the value 696, and 999211+696=999907 can be chosen, in which the value satisfies the precision requirement.

Supposing the initial value is 995321, since b=5 and c=3, therefore g=8−5=3, in the Table the value 3961, and 995321+3961=999282 may be picked. Now b=2 and c=1, hence g=8−2=6, in the Table, the value 696, and 999282+696=999978 can be chosen, in which the value satisfies the precision requirement.

Now, as the precision is altered to be 1.0001, for the initial value 991234, since b=1 and c=2, thus g=8−1=7, and in the Table the value 7981, and 991234+7981=999215 can be chosen. Now b=2 and c=1, hence g=8−2=6, in the Table the value 696 can be chosen, but since the positive precision requires to add 1, hence the value 798 is selected, resulting in 999215+798=1000013, which satisfies the precision requirement.

In order to generate the value 64738 with the start value 61234, it means to use the aforementioned Table as the general addition.

Since b=1 and the second digit must be 9 as shown in the Table, the start value has to be subtracted by the generation value; that is, 4−1=3 with one digit returned, obtaining 2xxx, which is 2975 as shown in the Table, indicating 61234+2975=64209, so next it is b=2, thus 7−2=5 with one digit returned, resulting in 4xx, which is 495 as shown in the Table; that is, 64209+495=64704 which is the value closest to 64738. Certainly, if there exists a semi-product with ten-digit and one-digit, it goes without saying that exactly the same value as 64738 can be derived. Those skilled ones in the art can appreciate that it works all the time that the target semi-product can be located with subtraction then one or two returned digit(s)! Such an effect results from the fact that 9 is the second digit of negative 1%, thus enabling the efficient filtering capability.

The texts set forth as above illustrate two major special effects of the Full-9 Principle.

Assume that there exists a resistor whose true value is 1234.567890123456789. However, if someone's instrument can provide only 6-digit data, this may give a result of 1234.56, or otherwise with an instrument of 12-digit data, it gives 1234.56789012. Alternatively, with an instrument allowable for 19-digit data, one may get a new true value. In other words, it should be appreciated that the true value of the semi-product of negative 1% is determined by the number of digits in the instrument, as illustrated by the true values in the above-said example. That is, if a 7-digit precision is required in the present case, then the instrument should be allowable for at least 7 digits. Hence, in theory, with infinite number of digits in the instrument, the resulted semi-product or the product obtained thereby has infinite number of digits as well. In other words, theoretically the true value can be deducted to the limit value. For example, the limit of resistance value is one single atom. The limit of weight is one single electron. Consequently, both the resistance and the weight are allowed to be quantized. However, the size can not be quantized, neither can time. As such, in MKS system, the M, S are infinite number of digits; whereas, the K is of limit digits or a boundary thereof exists.

Of course, as the precision in the part becomes equivalent to the counterpart of the instrument, it is certain that other methods will be developed to use the part to enhance the precision in the instrument, thus making out the part of even greater precision. With such a positive cycle, the precision can be significantly improved, theoretically creating a world of ultra-high precision. Therefore, the inventor's next invention is directed to an electrical meter of ultra-high precision.

In addition, according to current international standards, the resistance value for soft copper at 20° C. is 1.7241 micro-Ohm per cm, or 0.0000017241 Ohm per cm, which requires the instrument to have a capability of 11 digits or else a 5-digit instrument enabling scaling feature. No matter which value in micro-Ohm the electrical resistance value may be, it is possible to be acquired.

Furthermore, according the Table illustrated as above, it is possible to obtain any resistance value as long as the resistance value for 1 to 9 in each order of 10 of negative 1%, as shown in the following table:

TABLE

| 100,000-Digit | 10,000-Digit | 1000-Digit | 100-Digit | 10-Digit | 1-Digit |
|---|---|---|---|---|---|
| 99XXX.XXX | 99XX.XXX | 99X.XXX | 99.XXX | 9.9XX | 0.99X |
| 198XXX.XXX | 198XX.XXX | 198X.XXX | 198.XXX | 19.8XX | 1.98X |
| 297XXX.XXX | 297XX.XXX | 297X.XXX | 297.XXX | 29.7XX | 2.97X |
| 396XXX.XXX | 396XX.XXX | 396X.XXX | 396.XXX | 39.6XX | 3.96X |
| 495XXX.XXX | 495XX.XXX | 495X.XXX | 495.XXX | 49.5XX | 4.95X |
| 594XXX.XXX | 594XX.XXX | 594X.XXX | 594.XXX | 59.4XX | 5.94X |
| 693XXX.XXX | 693XX.XXX | 693X.XXX | 693.XXX | 69.3XX | 6.93X |
| 792XXX.XXX | 792XX.XXX | 792X.XXX | 792.XXX | 79.2XX | 7.92X |
| 891XXX.XXX | 891XX.XXX | 891X.XXX | 891.XXX | 89.1XX | 8.91X |
| 990XXX.XXX | 990XX.XXX | 990X.XXX | 990.XXX | 99.0XX | 9.90X |

In the present Table, the "X" means any number of the (the roughest) lower limit. The mechanical precision in the entire Table is negative 1%, but at different instrument precisions: 10-digit indicates 0.1%, 100-digit indicates 0.01%, 1000-digit indicates 0.001% etc.; accordingly the 1-digit in the present Table may refer down to micro-Ohm, or up to the resistance value of semiconductor or even reaching the range of insulating resistance values. Therefore, if it is wished that the 10-digit indicates 0.01%, it needs only to add one more digit of decimal point. The mechanically fabricated resistor currently available can only reach to 0.01%, while the instrument method of the present invention can easily surpass 0.0001%. Especially for capacitors, an error of −20% to +80% is quite common at present; however, through the present method, the error in the capacitor can be greatly reduced. Such a successful result represents a brand new frontier in terms of capacitor circuit designs.

It can be noticed that, with high resistance values, ultra-high precisions can be conveniently acquired, which is helpful for environment protection because the same result can be obtained with lower current thus enabling energy-saving.

It can be also noticed that, the products of high precision according to the present invention are measured and filtered by means of instrument in manufacturing, so the values can be identical at factory shipment, also implying 100% inspection. Such a result may eliminate the maintenance engineering as well as the sampling and inspection of quality control engineering in the assembly factory; all it needs is the fine-tuning in the final product. Accordingly, the designer may simplify the design with less used variable resistors, and it is no longer required to reveal the design drawings and maintenance technologies or other relevant skills to the assembly factory. In the event of product failure, only two possibilities can exist: one is the assigned component values may be erroneous, rather than the component manufactured according to the present invention; the other one is the design theory itself is wrong. Consequently, the present method facilitates the clearance of error in the component. With such a method, the quality at factory shipment can be identical, indicating total inspection quality control, which is particularly herein referred as consistent quality control. Hence the present invention can greatly contribute to improvements in manufacture and design industries for saving more manpower and materials and simplifying large amount of design works.

The aforementioned Table highlights that it is possible to create any resistance value precision ranging from 0.99X to 990XXX.XXX+990XX.XXX+990X.XXX+990.XXX+99.0XX+9.90X. Connecting a switch in series to each resistor represented by the Table may get a variable resistor of large range and degree of precision, as shown in FIG. 1, from 1 Ohm to 1,000,000 Ohms at an interval of 1 Ohm, which can be switched conveniently; besides, it can be also appreciated that the present method allows to effectively obtain the precision having the most number of scales and fulfilling specification requirements with the smallest number of resistors, symbolizing the most ideal achievement of the present invention.

For an alternative embodiment: although the precision of more than 0.001% can be easily achieved through the present invention, simply in terms of resistors, whereas, temperature may contribute about 0.01% of affection. No matter how precise it may be, the drift effect may inevitably occur due to influence by temperature. Fortunately there exist two types of resistance; one is the positive temperature coefficient and the other is the negative temperature coefficient. Assume that r1 represents the true value of the positive temperature coefficient, b1 represents the positive temperature coefficient (increase as temperature rises), r2 represents the true value of the negative temperature coefficient, b2 represents the negative temperature coefficient (reduce as temperature rises), and t stands for the temperature difference relative to 25° C., r251 stands for the resistance of r1 at 25° C. and r252 stands for the resistance of r2 at 25° C. Thus, it follows $$r1 = r251 + r252*t*b1 \tag{1}$$

$$r2 = r252 - r252*t*b2 \tag{2}$$

$$r = r1 + r2, \tag{3}$$

allowing the cancellation of the positive and negative temperature coefficients to get the resistance r0 insensitive to temperature, as below $$r251*b1 = r252*b2 \tag{4}$$

$$r0 = r251 + r252, \tag{5}$$

rearranging the equations and finally obtaining $$r251 = r0/(1 + b1/b2) \tag{6}$$

$$r252 = r0/(1 + b2/b1). \tag{7}$$

The last two equations (6) and (7) describe: r0 is required to create the unique value of the equations (6) and (7)! Such a value can be created only through the present method, with regards to the specific value for the semi-product allowable for being comprehensively manufactured. As a result, the method according to the present invention is able to manufacture the temperature insensitive resistor featuring the precision more than 0.001%. Besides, r251 and r252 also generally represent the resistor of other standard temperature value. Analogously, the temperature insensitive capacitor can be made by means of the present method, with applications of different equations.

The block gage with precise size is another embodiment for the present invention. Currently only a few sizes thereof are applicable; however, by using the aforementioned Table, it is possible to fabricate the composite block gage of any value, as the case for the variable resistor.

Yet another embodiment of the present invention is the weight, in which initially it uses the Full-9 Principle to create the order-10 high precision weight with a value of one 5 and five 1's, i.e., 5, 50, 500, 5000, 1, 10, 100, 1000 . . . and the like. Since the weight is made of metal, in creating these high precision weights, the negative 1% for each value is first made, then added up to form each semi-product; when the required precision is reached, have them melt together thereby completing one single weight.

Because the resistor in the present invention is essentially formed by combining multiple semi-products, the approach for the joint or combination may be various, as long as such joints are ensured to be firm without separation.

As for the combination of the block gage, the only way to accomplish the product is to have them mutually screwed tight with air separation.

Parallel Connection Mode:

For example, F=1234, R=1000, F−R=234 which value presents 3 digits, thus I=3.

Assuming G=0.56, which can be set based on manufacture precision or other conditions, placed into equation (E):

$$5273.5 <= T < 7320.8$$

T1=6125 may be arbitrarily chosen and put into equation (D), thus R1=1027. Let the original 1234 can be connected in parallel to 6125 and obtain 1027, thus H=2.34 becomes 0.27, which is smaller than G, accordingly narrows down the positive error.

Now F=1027, R=1000, F−R=27, which has two digits, thus I=2. Assuming G=0.56, put into equation (E), $$38037.04 <= T < 48259.$$

T1=40000 may be arbitrarily chosen and put into equation (D), thus R1=1001.3.

In case the precision is not good enough, the method may be repeated in the parallel connection mode process several times to obtain the ideal positive error.

In practical operation, it is possible to use both the serial connection and the parallel connection mode to achieve better combination.

Another advantage of the present invention is that, when the original precision is to be increased to a higher level of precision, it can be accomplished by first measuring the original values, then use serial connection or parallel connection to add new resistors.

For example, originally the production line was equipped with 1% machines; without the present invention, it would have been unavoidable to entirely repurchase new 0.1% machines for upgrading production line. To subsequently manufacture 0.01% products, it would have been inevitable to buy new 0.01% machines again. However, with the present invention, when 0.1% products are desired but machines in the factory remain 1%, then this can be accomplished by simply adding one extra resistor; again, while 0.01% is needed but machines remains 1%, this can be solved by adding another resistor after the 0.1%. Suppose originally, in the spare parts of the machine, there is space preserved for future use, then the advantage of using the present invention can be fully leveraged, arbitrarily adding or removing number of resistors, thus achieving the desired precision.

Another application for the present invention is integral circuits in semiconductor field. Similarly, assuming the precision of machine for producing integral circuit is 1%. Since the volume becomes smaller but rough precision for resistance remains unchanged, hence the spare part box for originally preserved space does not work completely, which is now replaced by switches, as shown in FIG. 1.

It is possible to manufacture in advance each series of resistance on the chip; when users want any specific value and related precision, they can turn on corresponding switch to connect specific resistors.

Suppose these switches are controlled by CPU, this will become a variable resistor with variable precision and resistance. Such a variable resistor can substitute any known resistor, which is suitable for maintenance or automatic control system.

Another usage of the present invention is in the military field. Taking serial connection mode for example, as long as each series of resistance is produced (with MSB for different digit, from 1 to 9, and each 9 resistors multiplied by total number of digits) and got measured beforehand, when no other tools are available or no way to acquire the same resistor, it is possible to use the present method, calculate, take out the corresponding resistance and perform connection for achieving the desired resistance. Repeat the method to produce multiple times, the resistance will remain unchanged.

The measurement results of the present method are completely determined by measurement apparatus. Whatever feature that the measurement apparatus possesses, the measurement value is the precision under such a feature.

From the capacitor parallel connection equation, we know that it is equal to the serial connection mode addition of the present invention; hence the present invention can be directly applied to achieve higher precision. As for the capacitor serial connection equation, it is equal to the parallel connection mode addition of the present invention, thus the present invention is also applicable.

In addition to resistor, the semi-product in the present invention can be various industrial products of electrical components, mechanical components and chemical formulation such as a capacitor, inductor, spring, damper, medicine, alloy, weight, gold ornament etc. And the electrical component is applied in the integrated circuit as well as the circuit board.

DESCRIPTION OF COMPONENT SYMBOLS IN DRAWINGS

R11-R19 resistance of same digits, for MSB=1 to MSB=9
R21-R29 resistance of same digits with one less digit than R11, for MSB=1 to MSB=9
R31-R39 resistance of same digits with one less digit than R21, for MSB=1 to MSB=9
in which MSB refers to the number of the highest digit in the value, e.g., for 1234, its MSB is 1; for 905, MSB is 9.

DESCRIPTION OF MAJOR COMPONENT SYMBOLS

Assigned Major Diagram: FIG. 1
R11-R19 resistance of same digits, for MSB=1 to MSB=9
R21-R29 resistance of same digits with one less digit than R11, for MSB=1 to MSB=9
R31-R39 resistance of same digits with one less digit than R21, for MSB=1 to MSB=9

The invention claimed is:
1. A system for achieving arbitrary precision, comprising:
a serial connection mode for obtaining a first approximation to a zero error result by means of a negative rough precision by addition for manufacturing a plurality of first semi-finished products with negative 1% rough precisions, and a measurement apparatus to measure a precision value of each first semi-finished product, wherein a Full-9 Principle is utilized to shift the first semi-finished products, and the sifted first semi-finished prod- ucts are added such that a first product value matches a predetermined precision; and a parallel connection mode for obtaining a second approximation to the zero error result by means of a positive rough precision with division for manufacturing a plurality of second semi-finished products of approximately positive 10% rough precision, and using the measurement apparatus to measure a precision value of each second semi-finished product, wherein an error shift formula is utilized to shift the second semi-finished products, and connect the second sifted semi-finished products in parallel such that a second product value matches the predetermined precision.

2. The system as claim 1, wherein said first semi-finished product or said second semi-finished product is an electrical component such as a resistor, capacitor or inductor etc.

3. The system as claim 2, wherein said electrical component is applied in the integrated circuit.

4. The system as claim 2, wherein said electrical component is applied in the circuit board.

5. The system as claim 1, wherein said first semi-finished product or said second semi-finished product is a mechanical component such as a spring or damper etc.

6. The system as claim 1, wherein said first semi-finished product or said second semi-finished product is a medicine.

7. The system as claim 1, wherein said first semi-finished product or said second semi-finished product is a chemical formulation.

8. The system as claim 1, wherein said first semi-finished product or said second semi-finished product is an applied material such as an alloy.

9. The system as claim 1, wherein said first semi-finished product or said second semi-finished product is a weight.

10. The system as claim 1, wherein said first semi-finished product or said second semi-finished product is a gold ornament.

* * * * *